(12) United States Patent
Fiet et al.

(10) Patent No.: US 9,352,268 B2
(45) Date of Patent: May 31, 2016

(54) FILTER ASSSEMBLY FOR A RESPIRATOR

(71) Applicant: Avon Protection Systems, Inc., Cadillac, MI (US)

(72) Inventors: Richard A. Fiet, Cadillac, MI (US); Christopher G. Estkowski, Pullman, MI (US); James Wilcox, Baltimore, MD (US)

(73) Assignee: Avon Protection Systems, Inc., Cadillac, MI (US)

( * ) Notice: Subject to any disclaimer, the term of this patent is extended or adjusted under 35 U.S.C. 154(b) by 471 days.

(21) Appl. No.: 13/890,618

(22) Filed: May 9, 2013

(65) Prior Publication Data

US 2013/0298775 A1   Nov. 14, 2013

Related U.S. Application Data

(60) Provisional application No. 61/644,997, filed on May 9, 2012.

(51) Int. Cl.
*A62B 19/00* (2006.01)
*B01D 53/04* (2006.01)
*A62B 23/02* (2006.01)

(52) U.S. Cl.
CPC ............ *B01D 53/0415* (2013.01); *A62B 19/00* (2013.01); *A62B 23/02* (2013.01)

(58) Field of Classification Search
CPC ..... A62B 19/00; A62B 23/02; B01D 53/0415
USPC ........................................................... 96/147
See application file for complete search history.

(56) References Cited

U.S. PATENT DOCUMENTS

| | | | |
|---|---|---|---|
| 5,158,077 A * | 10/1992 | Sundstrom | A62B 23/02 128/205.27 |
| 7,311,764 B2 | 12/2007 | Friday et al. | |
| 2005/0160911 A1 * | 7/2005 | Friday | A62B 23/02 96/134 |

* cited by examiner

*Primary Examiner* — Duane Smith
*Assistant Examiner* — Adam W Bergfelder
(74) *Attorney, Agent, or Firm* — McGarry Bair PC

(57) ABSTRACT

A filter assembly for use with a respirator may include a conformal filter having a body with at least one filter bed, an input end, and an output end recessed within the body and having an integral threaded connector having external threads adapted to thread onto a respirator inhalation connector, and a threaded connector piece removably mounted to the integral threaded connector of the conformal filter.

15 Claims, 11 Drawing Sheets

FILTER ASSSEMBLY FOR A RESPIRATOR

CROSS-REFERENCE TO RELATED APPLICATION

This application claims the benefit of U.S. Provisional Patent Application No. 61/644,997, filed May 9, 2012, which is incorporated herein by reference in its entirety.

BACKGROUND OF THE INVENTION

1. Field of the Invention

The invention relates to replaceable filter canister, which may be used with air purifying respirators including air filtration units, gas masks, powered air purifying respirators, breath assist devices, and CBRN systems.

2. Description of the Related Art

Replaceable filter canisters that are shaped to conform to the face of a user are disclosed and claimed in U.S. Pat. No. 7,311,764, which is incorporated herein by reference in its entirety. These filter canisters have a concave outlet wall with a projecting outlet fitting that is adapted to mount to an inlet fitting on a respirator mask. The outlet fittings typically have an external thread that is threadable into an internally threaded fitting on the respirator mask. These replaceable filter canisters, when installed on a respirator mask, sit more closely to the respirator mask than filter canisters that have a relatively flat outlet wall with a projecting outlet fitting. Typical filter canisters that have a relatively flat outlet wall are disclosed in U.S. Pat. No. 5,158,077. These filter canisters are adapted to be installed and removed in the field easily in order to replace spent canisters.

Some purchasers of respirators prefer the conformal filter canisters while other purchasers prefer the traditional flat outlet wall canisters. Therefore, suppliers would have to offer both types of canisters in order to meet all market needs. This market thus requires suppliers to make and inventory both types of canisters. In addition, a purchaser may have to inventory both types of canisters to meet the needs of different conditions.

SUMMARY OF THE INVENTION

According to the invention, a filter assembly includes a conformal filter having a body with at least one filter bed, an input end, and an output end with an integral connector recessed in the body and adapted to mount onto a respirator inhalation connector, and a connector piece removably mounted to the integral connector of the conformal filter including a sleeve having an axial passage therethrough and having at one end an interior fastener that is connected to the integral connector of the conformal filter and at another end having an external fastener adapted to mount onto a respirator inhalation connector, and a radial wall extending from the sleeve to an outer rim which abuts the body of the conformal filter.

In one embodiment, the connector piece and the conformal filter connector are configured so that the connector piece is removable from the conformal filter without the use of tools. The filter assembly may further include an interlock between the connector piece and the conformal filter to preclude the mounting of the connector piece on the conformal filter after removal.

In a preferred embodiment, the interlock may include resilient locking members. In another embodiment, the interlock may include a locking piece mounted to the connector piece.

In yet another embodiment, the filter assembly may include a seal between the connector of the conformal filter and the one end of the sleeve. The seal may include a resilient sealing member, for example, in the form of an elastomeric material, and be created by a predetermined torque between the connectors.

In one embodiment, the integral connector has external threads and the connector piece has internal threads that are threadable on the integral connector external threads.

In another embodiment, the integral connector and the connector piece may be connected together with a bayonet mounting.

In yet another embodiment, the filter assembly may include a welded frangible tab between the integral threaded connector and the conformal filter which prevents unintended loss of seal between the integral threaded connector and the conformal filter, and which facilitates removal of the threaded connector piece without the use of tools.

In another embodiment of the invention, a filter assembly kit includes a conformal filter having a body with at least one filter bed, an input end, and an output end recessed within the body and having an integral threaded connector having external threads adapted to thread onto a respirator inhalation connector, a threaded connector piece removably mounted to the integral threaded connector of the conformal filter including a sleeve having an axial passage therethrough and having at one end interior threads that are threadably connected to the integral threaded connector of the conformal filter and at another end having external threads adapted to thread onto a respirator inhalation connector and a radial wall extending from the sleeve to an outer rim which abuts the body of the conformal filter. The kit may include a seal that may be mounted between the integral threaded connector of the conformal filter and the one end of the sleeve of the threaded connector piece. The kit may also include an installation tool configured to assist in the mounting of the threaded connector piece to the conformal filter. The tool may have a part that is adapted to disengage the interlock for the mounting of the threaded connector piece to the conformal filter. The filter kit may further include a welded frangible tab between the integral threaded connector and the conformal filter which prevents unintended loss of seal between the integral threaded connector and the conformal filter. The welded frangible tab may also facilitate removal of the threaded connector piece without the use of tools.

In yet another embodiment of the invention, a filter assembly kit includes a conformal filter having a body with at least one filter bed, an input end, and an output end recessed within the body and having an integral threaded connector having external threads adapted to thread onto a respirator inhalation connector. The filter assembly kit may also include a threaded connector piece that can be removably mounted to the integral threaded connector of the conformal filter and a sleeve with an axial passage therethrough. The sleeve may have at one end interior threads that may be threadably connected to the integral threaded connector of the conformal filter and at another end external threads adapted to thread onto a respirator inhalation connector. The sleeve may also have a radial wall extending from the sleeve to an outer rim which abuts the body of the conformal filter. A seal may be mounted between the integral threaded connector of the conformal filter and the one end of the sleeve of the threaded connector piece. A locking piece may be selectively mountable to the connector piece. When the conformal filter, threaded connector piece, and the locking piece have been assembled, the locking piece forms a portion of an interlock between the threaded connector piece and the conformal filter to preclude remounting of the threaded connector piece on the conformal filter after the threaded connector piece has been removed from the conformal filter.

DESCRIPTION OF THE PREFERRED EMBODIMENT

Figure 1:
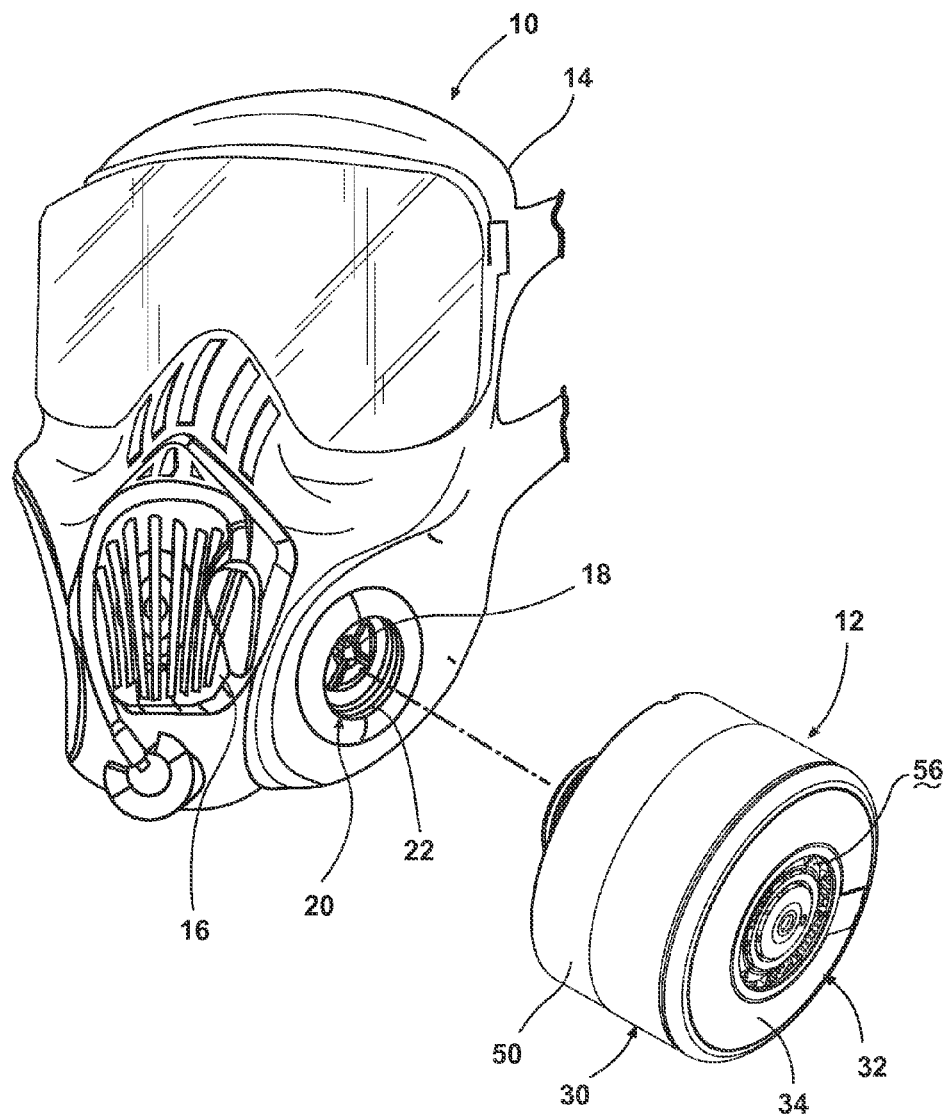
FIG. 1 is an exploded perspective view of a gas mask and a filter assembly according to an embodiment of the invention.

FIG. 1 illustrates one example of a respirator assembly 10 that may be used with a filter assembly 12 according to an embodiment of the invention. The respirator 10 is illustrated for exemplary purposes only and it may be understood that the filter assembly 12 may be used with any suitable respirator assembly or breathing apparatus. A mask face-piece 14 may include an exhalation valve (not shown), a speech module 16, inhalation valves (not shown) coupled with an inlet port 18 to which the filter assemblies 12 may be removably mounted. Filter mounts or respirator inhalation connectors 20 are included at the inlet ports 18 at lower lateral portions of the mask face-piece 14 and include internal threads 22. The filter assembly 12 can be mounted to the mask face-piece 14 by threading the filter assembly 12 onto the internal threads 22 of the respirator inhalation connector 20.

Figure 2:
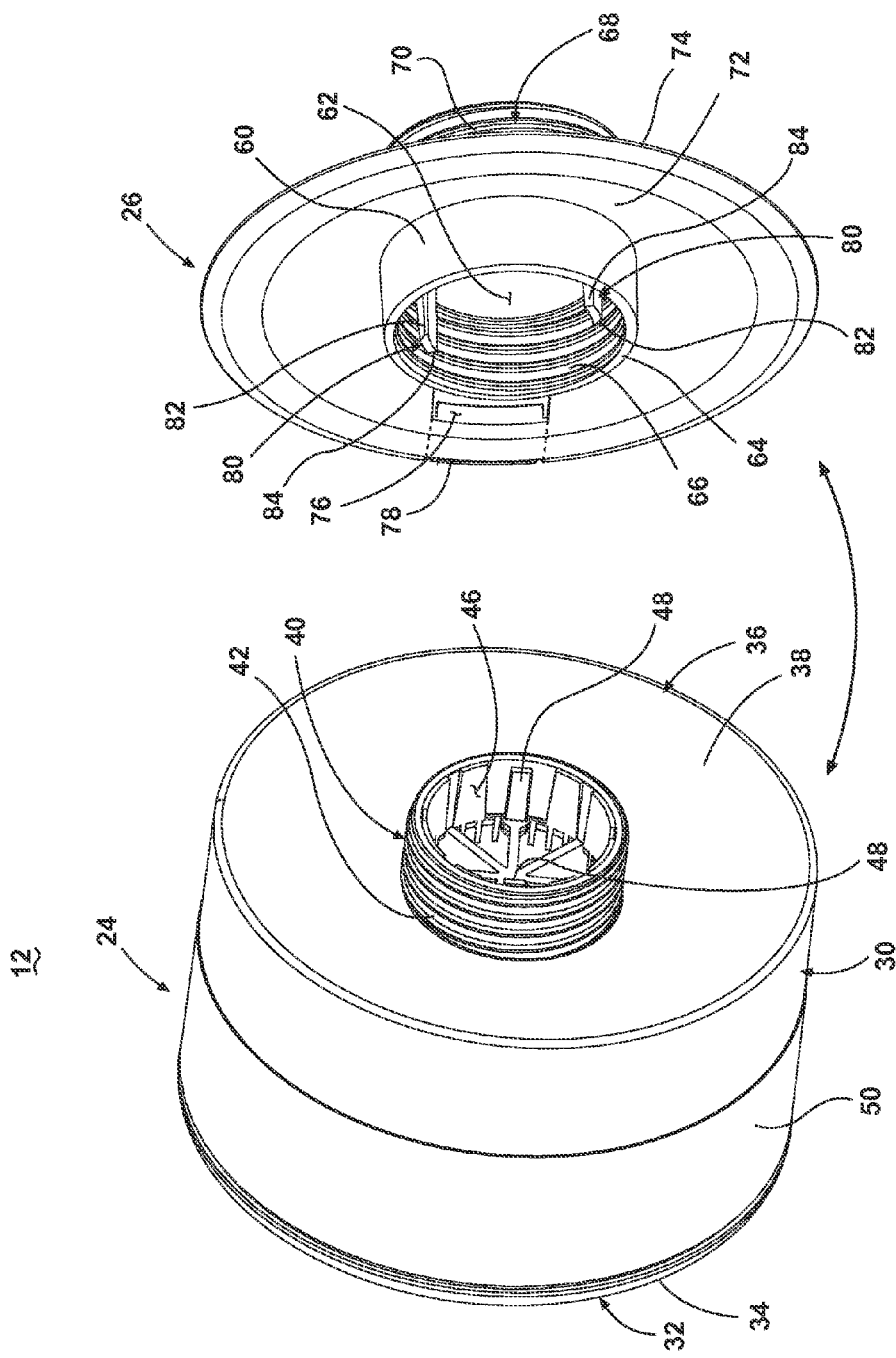
FIG. 2 is an exploded perspective view of the filter assembly of FIG. 1.

As better illustrated in FIG. 2, the filter assembly 12 may include a conformal filter 24 and a threaded connector piece 26 that may be removably mounted to the conformal filter 24.

The entire filter assembly 12 may be mounted to the respirator assembly 10 to provide a planar filter canister assembly; alternatively, the conformal filter 24 may be mounted to the respirator assembly 10 to provide a conformal filter canister assembly.

Figure 3:
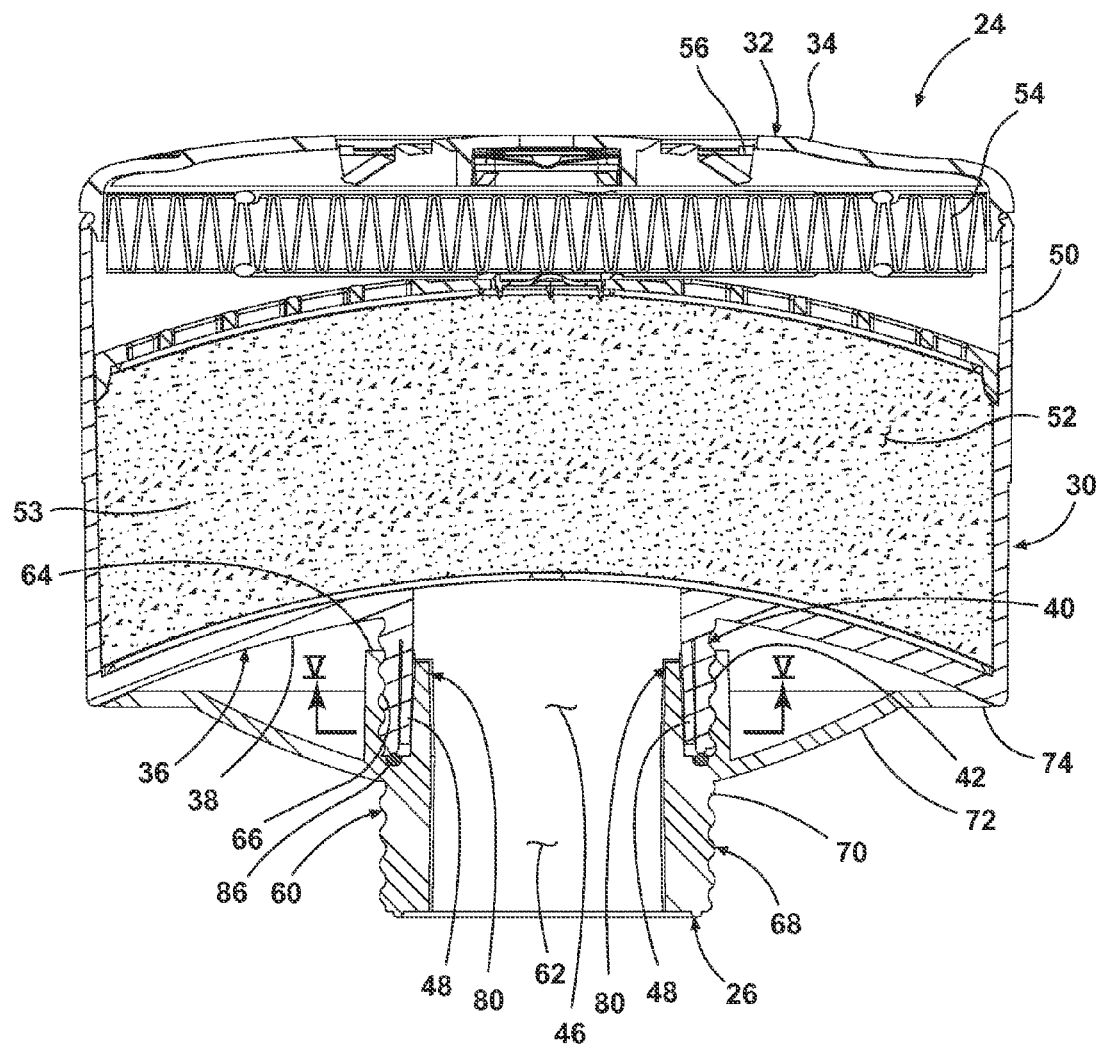
FIG. 3 is an axial cross-sectional view of the filter assembly of FIG. 2.

The conformal filter 24 has a body 30 having an input end 32 with a convex inlet wall 34 and an output end 36 with a concave outlet wall 38. As illustrated more clearly in FIG. 3, the concave outlet wall 38 is recessed within the body 30 and includes a hollow sleeve projecting outwardly from the concave outlet wall 38. The hollow sleeve has external threads 42 that are adapted to thread onto the respirator inhalation connector 20. More specifically, the integral threaded connector 40 has external threads 42 that matingly interconnects with internal threads 22 of the respirator inhalation connectors 20 of the mask face-piece 14, for mounting the conformal filter 24 to the mask face-piece 14. The integral connector 40 forms an outlet aperture 46 for fluid communication with the inlet port 18 when the conformal filter 24 is attached to the mask face-piece 14. The output end 36 also includes flexible tabs 48, which extend into the outlet aperture 46.

The convex inlet wall 34 and the concave outlet wall 38 may be in a parallel, spaced-apart relationship joined by a peripheral outside wall 50 to define an enclosed filter chamber 52 in which filter elements may be retained. At least one generally conventional particulate filter element 54 and at least one conventional adsorption filter bed 53 are typically retained within the filter chamber 52. The airflow through the conformal filter 24 is axial, passing into the body 30 through openings 56 in the inlet wall 34, through the particulate filter element 54 and the adsorbent filter bed 53, and exiting the conformal filter 24 through the outlet aperture 46 in the outlet wall 38. It is contemplated that alternative filter elements may be retained in various ways within the filter chamber 52.

The threaded connector piece 26 includes a sleeve 60 having an axial passage 62 therethrough and having at one end 64 interior threads 66, which are threadably connected to the integral threaded connector 40 of the conformal filter 24. At another end 68, the sleeve 60 may include external threads 70 adapted to thread onto the respirator inhalation connector 20. A radial wall 72 is illustrated as extending from the sleeve 60 to an outer rim 74 which may abut the body 30 of the conformal filter 24 when the threaded connector piece 26 and the conformal filter 24 are mounted together. An opening 76 (FIG. 2) and a frangible tab 78 (FIG. 2) may be included in the radial wall 72. The threaded connector piece 26 may also include cantilevered flanges 80 that have a ramped portion 82 (FIG. 2) on one side for removing the threaded connector piece 26 from the conformal canister and have perpendicular edges 84 (FIG. 2) on the other side to prevent the threaded connector piece 26 from being installed on the conformal filter 24 without a special tool. The connection between the threaded connector piece 26 and conformal filter 24 must be air-tight and in this manner a seal 86 in the form of an elastomeric O ring that is square in cross-section is provided between the integral threaded connector 40 of the conformal filter 24 and the one end 64 of the sleeve 60.

Figure 4:
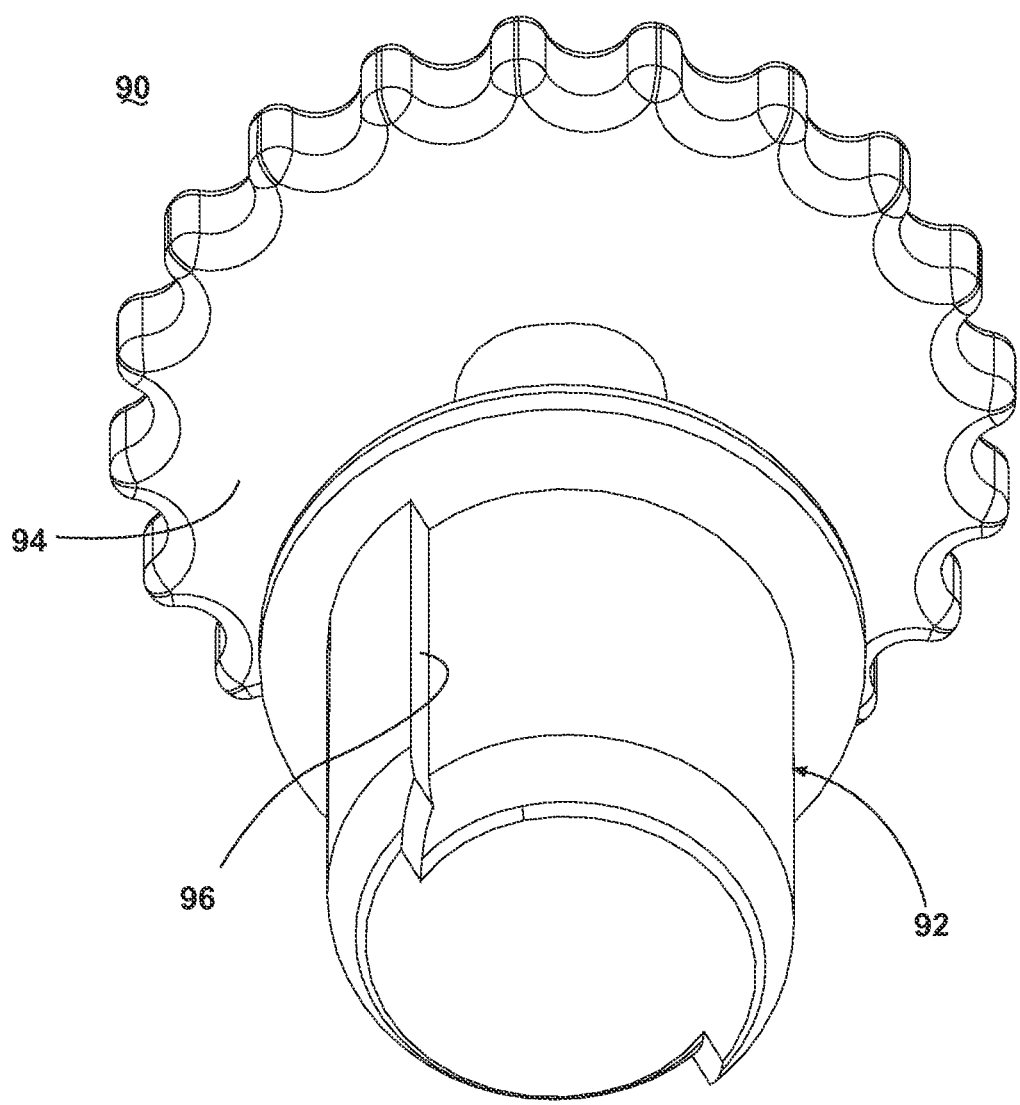
FIG. 4 is a perspective view of a tool that may be used to assemble the filter assembly of FIG. 2 according to an embodiment of the invention.
Figure 5:
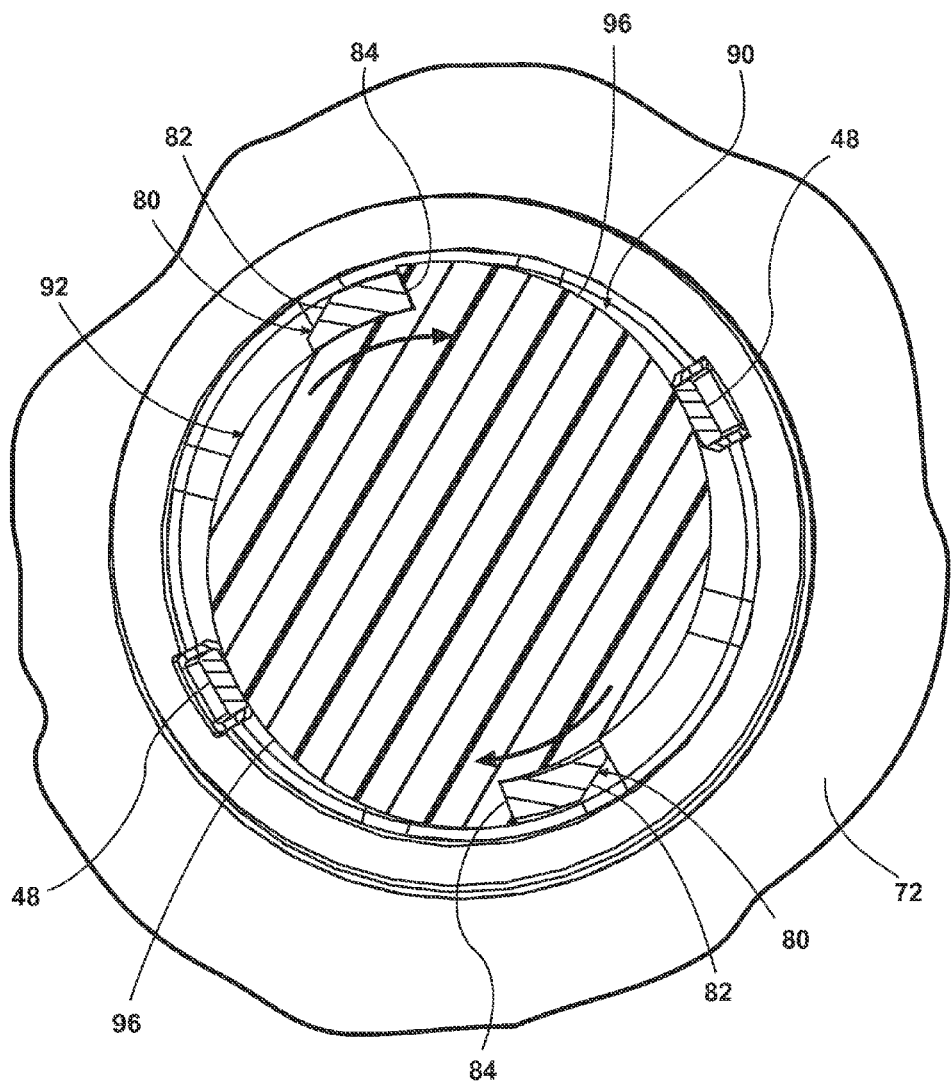
FIG. 5 is a transverse cross-sectional view of the filter assembly of FIG. 2 and the tool of FIG. 4 taken along lines V-V of FIG. 3.
Figure 6:
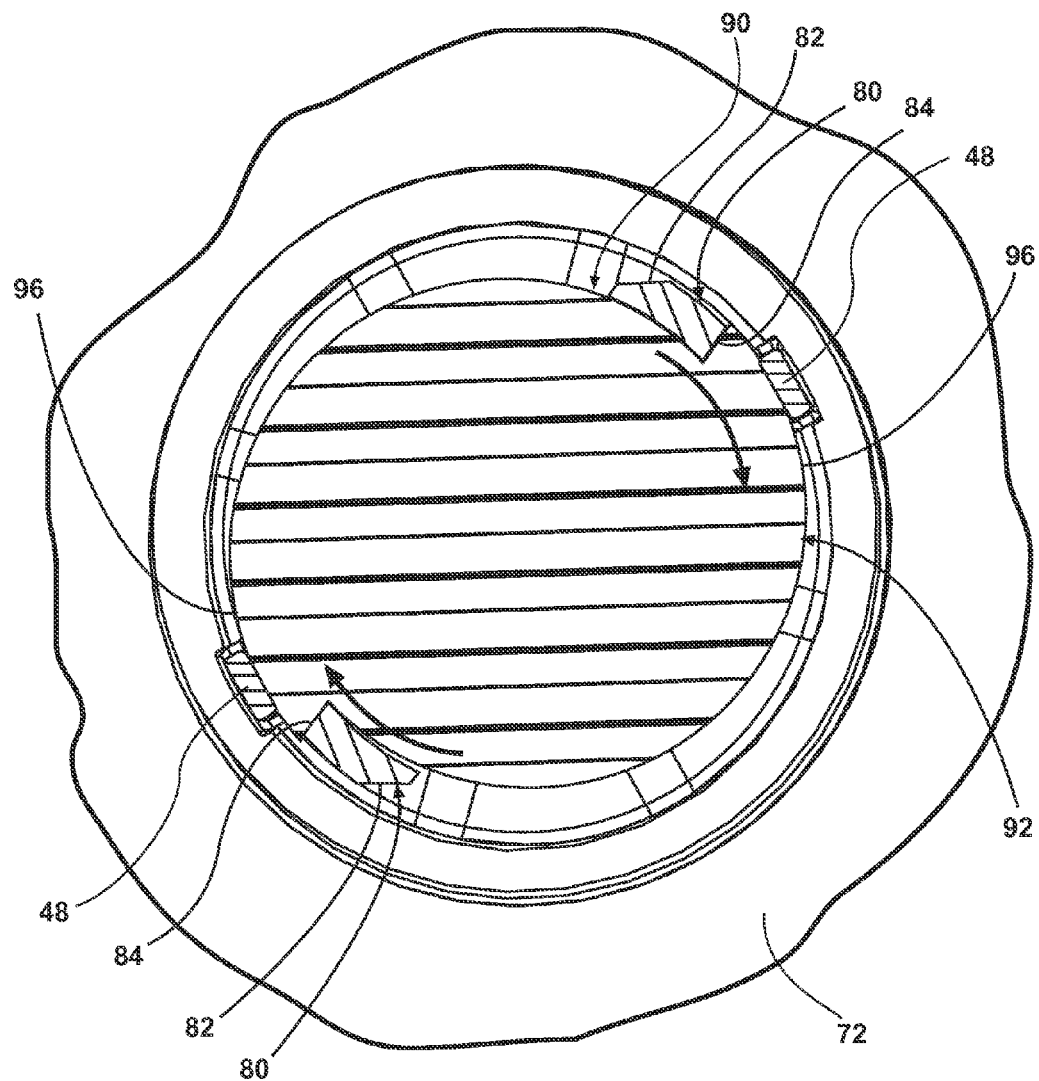
FIG. 6 is a second cross-sectional view of the filter assembly and tool of FIG. 5 where the tool has been advanced in a rotational direction indicated by the arrows.
Figure 7:
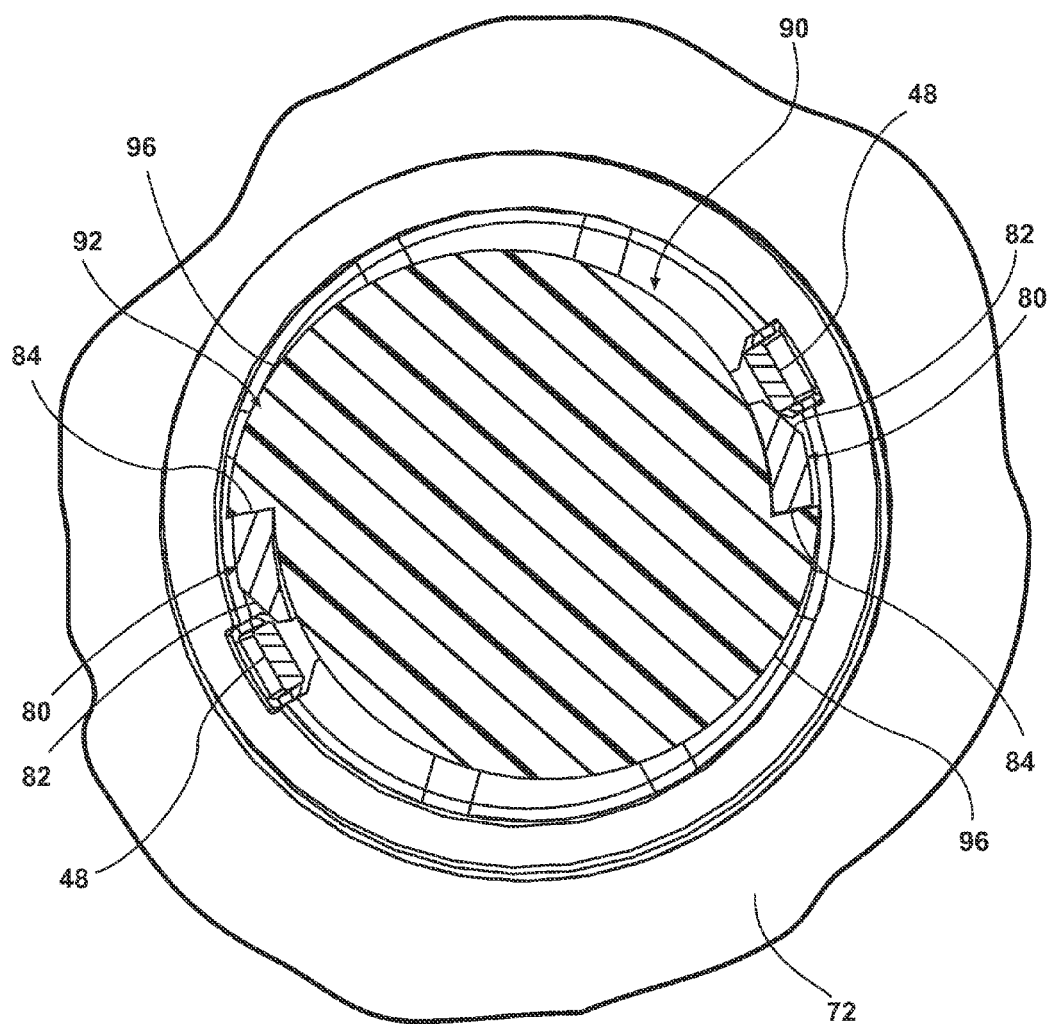
FIG. 7 is another cross-sectional view of the filter assembly and tool of FIG. 5 where the tool has been advanced from its position in FIG. 6.
Figure 8:
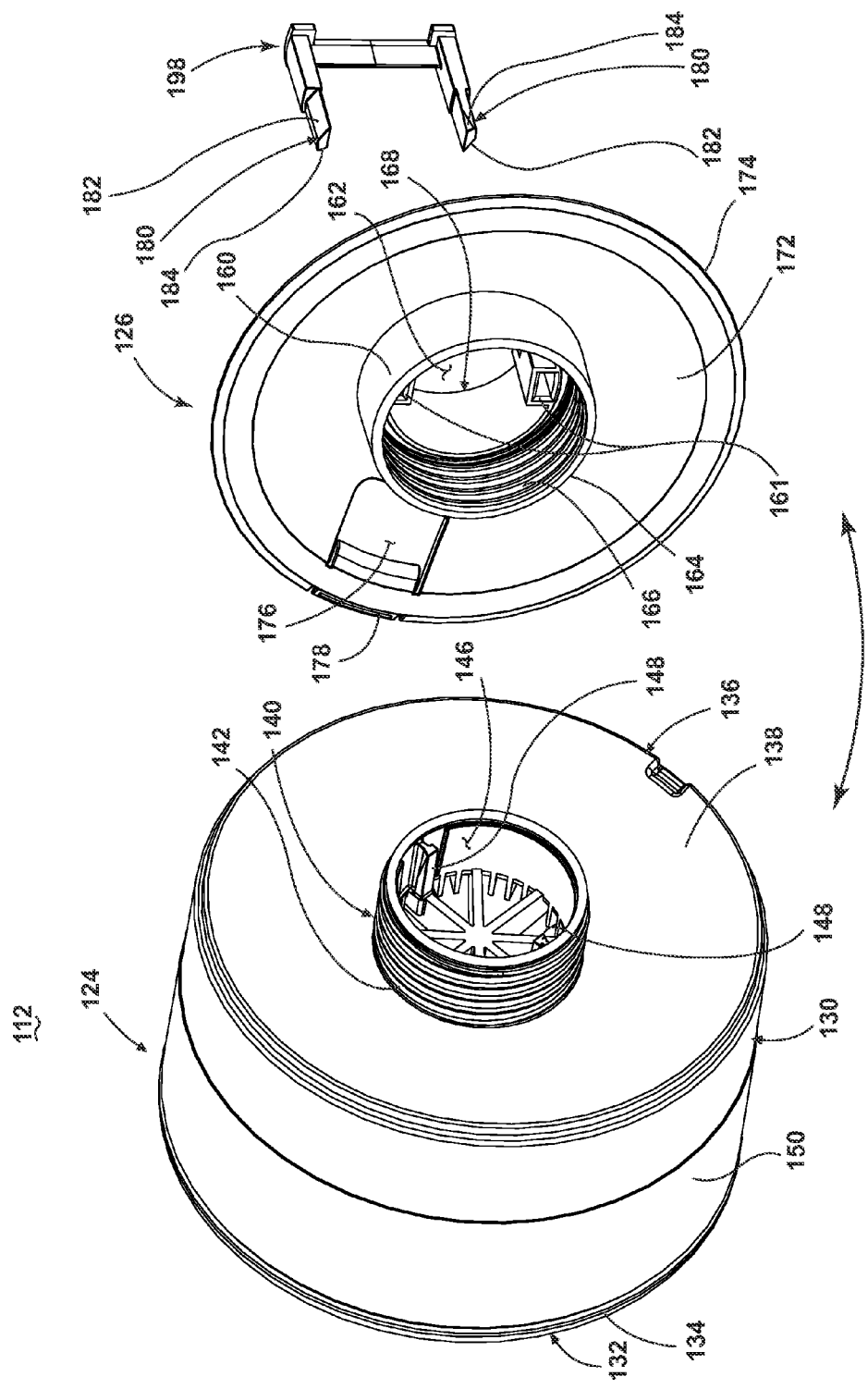
FIG. 8 is an exploded perspective view of a filter assembly according to another embodiment of the invention.

It is contemplated that the threaded connector piece 26 may be installed and verified to have a leak tight seal in a factory or other suitable location onto the conformal filter 24 through use of a tool 90, an example of which is illustrated in FIG. 4. It is contemplated that the conformal filter 24, threaded connector piece 26, and tool 90 may be sold in a kit to achieve the assembly of the filter assembly 12. The tool 90 may include a body 92 and a handle 94. A cam portion 96 may be included in the body 92 and may be configured to transform rotary motion of the tool 90 into linear motion of the tabs 48 to adjust the position of the tabs 48. More specifically, as the tool 90 and threaded connector piece 26 are rotated in the directions illustrated by the arrows in FIG. 5 the tabs 48 are radially retracted as they ride up along the increasing width of the cam portion 96 of the tool 90 and compressed with the integral threaded connector 40 such that the perpendicular edges 84 of the cantilevered flanges 80 of the threaded connector piece 26 pass by the compressed tabs 48 and the threaded connector piece 26 can therefore be threaded into place on the conformal filter 24 as shown in FIG. 6. After the cantilevered flanges 80 pass by the compressed tabs 48 and the tool 90 and threaded connector piece 26 continue to rotate in the direction of the arrows, the tabs 48 may return to their uncompressed state as shown in FIG. 7 and again ride along the cam portion 96 as the rotation is continued until the threaded connector piece 26 is properly mounted and sealed to the conformal filter 24.

The seal 86 can be compressed by threading the one end 64 having the interior threads 66 to the integral threaded connector 40 with a predetermined torque. This predetermined torque may be applied by any suitable mechanism such as, by way of non-limiting example, a servo driven torque wrench. The threaded connector piece 26 as installed in the factory or other suitable location has a predetermined torque specification for the seal 86 to compensate for manufacturing tolerances. Given typical component tolerances, the threaded connector piece 26 may not stop at a particular location given a consistent torque as each filter assembly 12 may be different due to normal part variation. Therefore, a predetermined torque is set at the factory to ensure a consistent air-tight seal between the threaded connector piece 26 and the conformal filter 24.

When the threaded connector piece 26 is properly mounted to the conformal filter 24, the outer rim 74 of the threaded connector piece 26 may be tack welded to the concave outlet wall 38 of the conformal canister 24 by ultrasonically welding the frangible tab 78 to the concave outlet wall 38 to ensure that the assembly is not unintentionally disassembled as could happen when removing the filter assembly 12 from the respirator 10. Further, with the outer rim 74 tack welded to the concave outlet wall 38, the predetermined torque on the seal 86 is maintained, thereby preventing an inadvertent loss of seal during removal or refitting of the assembly 12. Further, shrink-wrapped film may be provided around the outside of the filter assembly 12 save for at the other end 68 of the sleeve 60 that is adapted to be threaded onto the respirator inhalation connector 20. It is contemplated that the filter assembly 12 may be used with or without the shrink wrap on it and that the filter assembly 12 may be mounted on the mask face-piece 14 or other suitable respirator or device to provide a planar filter canister assembly.

In the event that a user wishes to only use the conformal filter 24 and have a conformal filter canister assembly, it is contemplated that the threaded connector piece 26 can be removed from the conformal filter 24. Such a removal may be done in the field without the use of tools. More specifically, the shrink-wrap, if any, can be removed by the user and then the user can remove the frangible tab 78 by breaking the weld so that the threaded connector piece 26 may be unscrewed from the conformal filter 24. More specifically, a user may put their finger through the finger hole 76 to break the frangible tab 78 and remove the frangible tab 78 so that the threaded connector piece 26 can be unscrewed from the conformal filter 24. The threaded connector piece 26 can be rotated in a direction opposite that indicated in FIG. 5 and the tabs 48 can ride up the ramped portion 82 of the cantilevered flanges 80 of the threaded connector piece 26 such that the tabs 48 are radially compressed and the cantilevered flanges 80 can pass by the compressed tabs 48 and the threaded connector piece 26 can thus be threaded off of the conformal filter 24. Thus, the ramped portions 82 cam the tabs 48 radially outward so that the threaded connector piece 26 can be removed from the conformal filter 24 without the use of tools.

It will be understood that once the threaded connector piece 26 is removed from the conformal filter 24 it may not be reconnected with the conformal filter 24 and used unless the tool 90 is used and the appropriate predetermined torque is applied to create the proper air-tight seal. An interlock between the threaded connector piece 26 and the conformal filter 24 is formed to preclude the mounting of the threaded connector piece 26 back on the conformal filter 24 after removal of the threaded connector piece 26. More specifically, without the tool 90 the tabs 48 would abut against the perpendicular edges 84 of the cantilevered flanges 80 of the threaded connector piece 26; thus forming an interlock that would not allow the threaded connector piece 26 to be threaded into place on the conformal filter 24.

FIGS. 8-12 illustrate another embodiment of a filter assembly 112. The filter assembly 112 is similar to the embodiment described above; therefore, like parts will be identified with like numerals increased by 100, with it being understood that the description of the like parts of the earlier embodiment applies to this embodiment, unless otherwise noted. One difference between the filter assembly 112 and the filter assembly 12 is that the threaded connector piece 126 does not include cantilevered flanges. Instead, the threaded connector piece 126 includes a locking piece 198, which may be selectively mounted within the sleeve 160. More specifically, the sleeve 160 is illustrated as including retaining portions 161, within which the locking piece may be received. The locking piece 198 includes legs 180 that have a ramped portion 182 on one side for removing the threaded connector piece 126 from the conformal filter 124 and have oppositely ramped edges 184 on the other side to prevent the threaded connector piece 126 from being reinstalled on the conformal filter 124.

Figure 9:
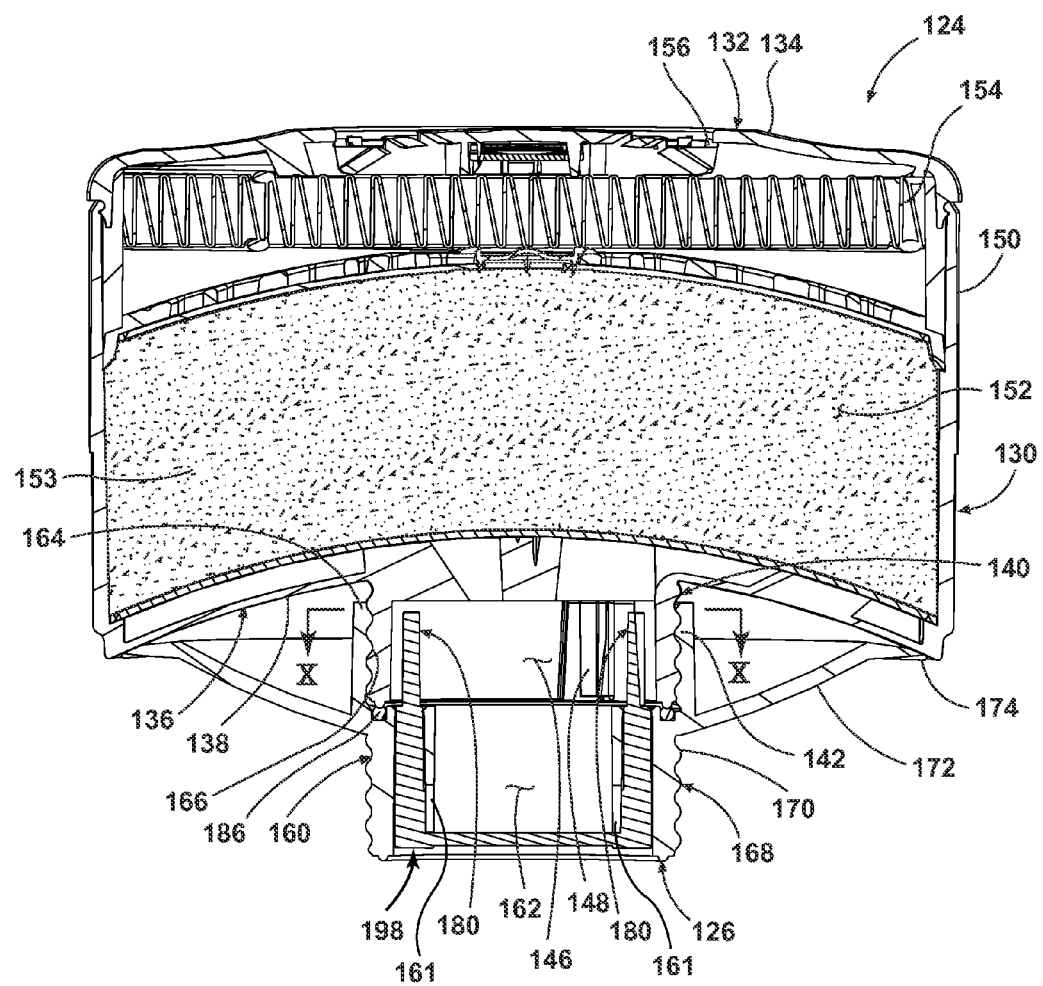
FIG. 9 is an axial cross-sectional view of the filter assembly of FIG. 8.
Figure 10:
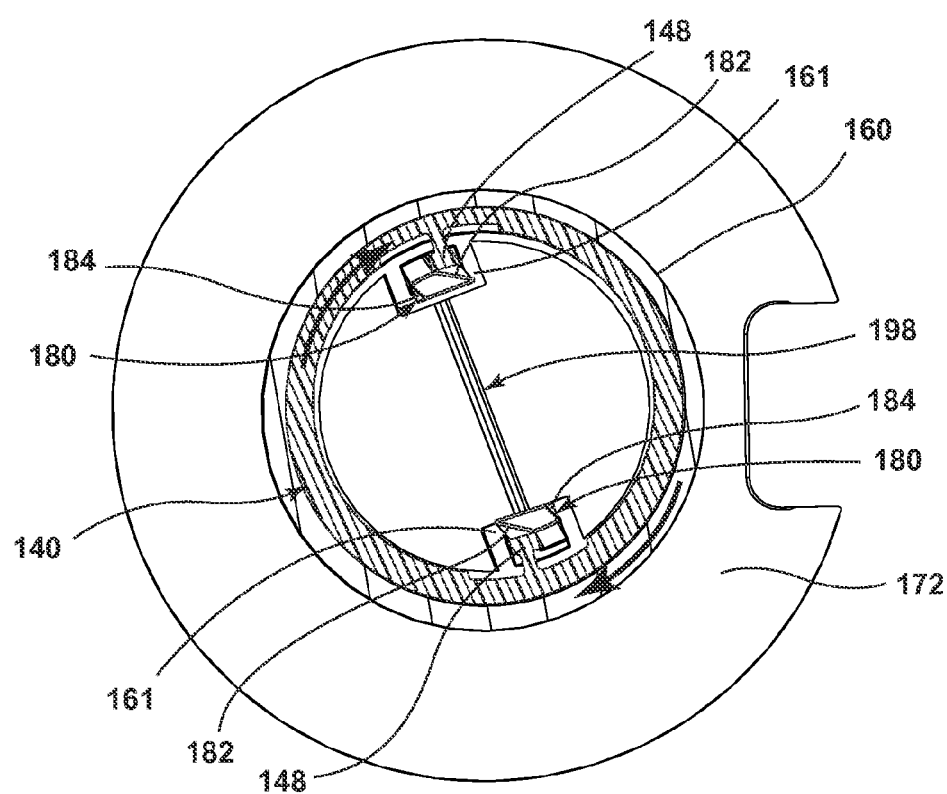
FIG. 10 is a transverse cross-sectional view of the filter assembly of FIG. 8 taken along lines X-X of FIG. 9 with a connector piece in an initial rotational position with respect to the conformal filter to illustrate the process of removing the connector piece from the conformal filter.

As shown in FIG. 9, as with the above embodiment, a seal 186 may be provided between the integral threaded connector 140 of the conformal filter 124 and the one end 164 of the sleeve 160. It is contemplated that the threaded connector piece 126 may be installed and verified to have a leak tight seal in a factory or other suitable location onto the conformal filter 124. This installation may be done by threading the threaded connector piece 126 onto the conformal filter 124 to a specified torque. As with the above embodiment, the seal 186 can be compressed by threading the one end 164 having the interior threads 166 to the integral threaded connector 140 with a predetermined torque. Unlike the above embodiment the protrusions 148 do not need to be compressed during installation of the threaded connector piece 126 onto the conformal filter 124.

When the threaded connector piece 126 is properly mounted to the conformal filter 124, the locking piece 198 can then be installed within the retaining portions 161 and fixed into place such as by ultrasonically welding the locking piece to the threaded connector piece 126. Further, the outer rim 174 of the threaded connector piece 126 may be tack welded to the concave outlet wall 138 of the conformal canister 124 by ultrasonically welding the frangible tab 178 to the concave outlet wall 138. Having the outer rim 174 tack welded to the concave outlet wall 138 has the benefit of ensuring that the predetermined torque on the seal 186 is maintained, preventing an inadvertent loss of seal during removal or refitting of the assembly 112. Further, shrink-wrapped film may be provided around the outside of the filter assembly 112 save for at the end 168 of the sleeve 160 that is adapted to be threaded onto the respirator inhalation connector 20. It is contemplated that the filter assembly 112 may be used with or without the shrink wrap on it and that the filter assembly 112 may be mounted on the mask face-piece 14 or other suitable respirator or device to provide a conformal filter canister assembly.

In the event that a user wishes to only use the conformal filter 124 and have a conformal filter canister assembly, it is contemplated that the threaded connector piece 126 can be removed from the conformal filter 124. Such a removal may be done in the field without the use of tools. More specifically, the shrink-wrap, if any, can be removed by the user and the user can put their finger through the finger hole 176 to remove the frangible tab 178 by breaking the weld so that the threaded connector piece 126 can be unscrewed from the conformal filter 124. The threaded connector piece 126 can be rotated in a direction illustrated by the arrow in FIG. 10 and the ramped portion 182 of the legs 180 of the locking piece can ride up the protrusions 148 causing the legs 180 of the locking piece 198 to be radially compressed such that the legs 180 can pass by the protrusions 148 and the threaded connector piece 126 can thus be threaded off of the conformal filter 124.

Figure 11:
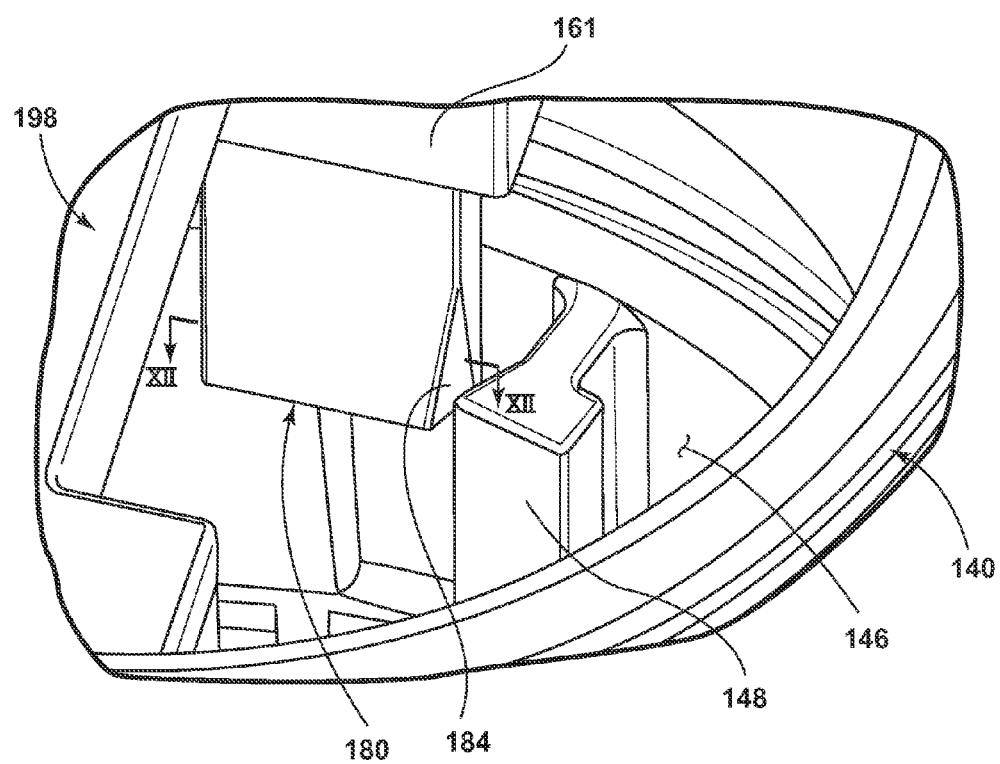
FIG. 11 is a perspective view of a portion of the filter assembly of FIG. 8 illustrating the interlock between the threaded connector piece and the conformal filter after the threaded connector piece has been removed from the conformal filter.
Figure 12:
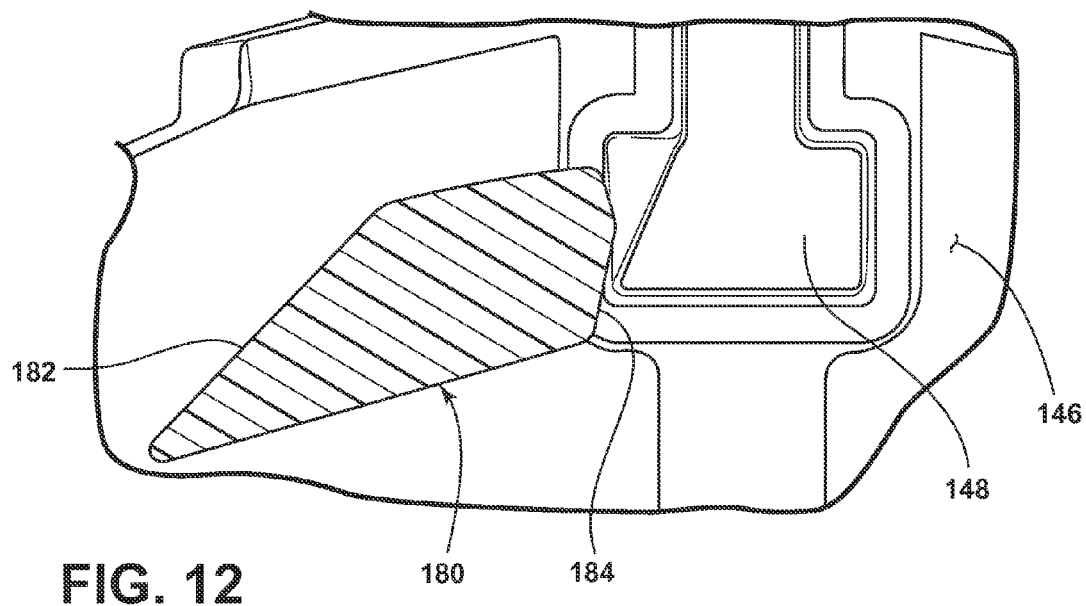
FIG. 12 is a perspective view of a portion of the filter assembly of FIG. 8 similar to FIG. 11 with a portion cut along lines XII-XII to further illustrate the interlock between the threaded connector piece and the conformal filter after the threaded connector piece has been removed from the conformal filter.

When the threaded connector piece 126 and the attached locking piece 198 have been removed from the conformal filter 124 they cannot be reconnected with the conformal filter 124. An interlock between the locking piece 198 of the threaded connector piece 126 and the conformal filter 124 is formed to preclude the mounting of the threaded connector piece 126 back on the conformal filter 124 after removal of the threaded connector piece 126. More specifically, the protrusions 148 abut against the oppositely angled edges 184 of the legs 180 of the locking piece 198; thus forming an interlock with the protrusion 148 that would preclude the threaded connector piece 126 from being rethreaded onto the conformal filter 124 as shown in FIG. 11. FIG. 12 illustrates how the oppositely angled edge 184 forces the legs 180 diametrically outwardly, catching behind tabs 148 and locks the assembly from attempted reinstallation of the threaded connector piece 126 back on the conformal filter 124.

Thus, as described a above, a filter assembly (12, 112) comprises a conformal filter (24, 124) having a body (30, 130) with at least one filter bed (53, 153), an input end (32, 132), and an output end (36, 136) with an integral connector (40, 140) recessed in the body (30, 130) and adapted to mount onto a respirator inhalation connector (20). A connector piece (26, 126) may be removably mounted to the integral connector (40, 140) of the conformal filter (24, 124) and may include a sleeve (60, 160) having an axial passage (62, 162) therethrough. The sleeve may include, at one end (64, 164), an interior fastener (66, 166) that is connected to the integral connector (40, 140) of the conformal filter (24, 124) and at another end (68, 168) an external fastener (70, 170) adapted to mount onto a respirator inhalation connector (20). A radial wall (72, 172) may extend from the sleeve (60, 160) to an outer rim (74, 174) which abuts the body (30, 130) of the conformal filter (24, 124). The filter assembly may further comprise an interlock between the connector piece (26, 126) and the conformal filter (24, 124) to preclude the mounting of the connector piece (26, 126) on the conformal filter (24, 124) after removal.

The interlock may include resilient locking members (48, 148). The filter assembly may also include a locking piece (198) mounted to the connector piece (126) to form a portion of the interlock. The connector piece (26, 126) and the conformal filter (24, 124) connector may be configured so that the connector piece (26, 126) is removable from the conformal filter (24, 124) without the use of tools.

The filter assembly may further a seal (86, 186) between the connector (40, 140) of the conformal filter (24, 124) and the one end of the sleeve (60, 160). The seal (86, 186) may be made of an elastomeric material. The conformal filter (24, 124) integral connector (40, 140) and connector piece (26, 126) may be connected together with a predetermined torque. In one embodiment, the integral connector (40, 140) may have external threads (42, 142) and the connector piece (26, 126) may have internal threads (66, 166) that are threadable onto the integral connector (40, 140) external threads (42, 142). In another embodiment, the integral connector (40, 140) may be connected to the connector piece (26, 126) with a well-known bayonet connector.

A welded frangible tab (78, 178) may be positioned between the connector piece (26, 126) and the conformal filter (24, 124) to prevent unintended loss of seal between the integral threaded connector (40, 140) and the conformal filter (24, 124). The welded frangible tab (78, 178) may also facilitate removal of the threaded connector piece (26, 126) without the use of tools.

In addition, as described above, a filter assembly kit comprises a conformal filter (24, 124) having a body (30, 130) with at least one filter bed (53, 153), an input end (32, 132), and an output end (36, 136) recessed within the body (30, 130). An integral threaded connector (40, 140) may have external threads (42, 142) adapted to thread onto a respirator inhalation connector (20). A threaded connector piece (26, 126) may be removably mounted to the integral threaded connector (40, 140) of the conformal filter (24, 124). The treaded connector piece (26, 126) may include a sleeve (60, 160) having an axial passage (62, 162) therethrough and, at one end (64, 164), interior threads (66, 166) that may be threadably connected to the integral threaded connector (40, 140) of the conformal filter (24, 124) and, at another end (68, 168), external threads (70, 170) adapted to thread onto a respirator inhalation connector (20). A radial wall (72, 172) may extend from the sleeve (60, 160) to an outer rim (74, 174) which abuts the body (30, 130) of the conformal filter (24, 124). A seal (86, 186) may be mounted between the integral threaded connector (40, 140) of the conformal filter (24, 124) and the one end of the sleeve (60, 160) of the threaded connector piece (26, 126 An installation tool (90) may be configured to facilitate the mounting of the threaded connector piece (26, 126) to the conformal filter (24, 124).

An interlock may be positioned between the threaded connector piece (26, 126) and the conformal filter (24, 124) to preclude the mounting of the threaded connector piece (26, 126) on the conformal filter (24, 124) absent the use of the tool. The tool may disengage the interlock for the mounting of the threaded connector piece (26, 126) to the conformal filter (24, 124).

A welded frangible tab (78, 178) may be positioned between the connector piece (26, 126) and the conformal filter (24, 124) to which prevents unintended loss of seal between the integral threaded connector (40, 140) and the conformal filter (24, 124), and may also facilitate removal of the threaded connector piece (26, 126) without the use of tools.

In addition, a filter assembly kit may also comprise a conformal filter (124) having a body (130) with at least one filter bed (153), an input end (132), and an output end (136) recessed within the body (130). An integral threaded connector (140) having external threads (142) may be adapted to thread onto a respirator inhalation connector (20. A threaded connector piece (126) may be removably mounted to the integral threaded connector (140) of the conformal filter (124). The threaded connector piece (126) may include a sleeve (160) having an axial passage (162) therethrough and, at one end (164), interior threads (166) that may be threadably connected to the integral threaded connector (140) of the conformal filter (124). The sleeve (160) may include, at another end (168), external threads (170) adapted to thread onto a respirator inhalation connector (20). A radial wall (172) may extend from the sleeve (160) to an outer rim (174) which abuts the body (130) of the conformal filter (124). A seal (186) may be mounted between the integral threaded connector 40 and the one end of the sleeve (160) of the threaded connector piece (126). A locking piece (1198) may be selectively mountable to the connector piece (126) and configured so that when the conformal filter (124), threaded connector piece (126), and the locking piece (198) have been assembled, the locking piece (198) forms a portion of an interlock between the threaded connector piece (126) and the conformal filter (124) to preclude remounting of the threaded connector piece (126) on the conformal filter (124) once the threaded connector piece (126) has been removed from the conformal filter (124).

The above described embodiments provide a variety of benefits including that a single filter assembly may provide both planar and conformal filter canister functionality. In this manner, the above described embodiments allow for a single filter assembly to be sold for a variety of different applications. By way of non-limiting example, the above described embodiments provide a single filter assembly to accommodate the thread standards of the CE (EU), NIOSH (US), and NATO. Further the above described embodiments provide a structure for conversion of the planar filter assembly to a conformal assembly in the field without the use of tools and preclude the conversion back to a planar assembly in the field due to an interlock between the components. This feature is a benefit because it ensures that the filter assembly can only be used when an air-tight seal is created with sufficient torque on the threaded connector piece to make a hermetic seal between the conformal filter and the threaded connector piece in the factory.

While this invention has been specifically described in connection with certain specific embodiments thereof, it is to be understood that this is by way of illustration and not of limitation. For example, the invention has been described with respected to threaded connectors between the connector piece and the conformal filter. It is within the scope of the invention to use bayonet connections in lieu of the threaded connections between the connector piece and the conformal filter as well as between the conformal filter and the respirator and between the connector piece and the respirator. Further, while the embodiments have been described with respect to a respirator, the invention can also be used with air filtration units, gas masks, powered air purifying respirators, breath assist devices, and CBRN systems. Reasonable variation and modification are possible within the scope of the foregoing description and drawings without departing from the scope of the invention, which is defined in the appended claims.

What is claimed is:

1. A filter assembly comprising:
   a conformal filter having a body with at least one filter bed, an input end, and an output end with an integral connector recessed in the body and adapted to mount onto a respirator inhalation connector;
   a connector piece removably mounted to the integral connector of the conformal filter including a sleeve having an axial passage therethrough and having at one end an interior fastener that is connected to the integral connector of the conformal filter and at another end having an external fastener adapted to mount onto a respirator inhalation connector; and
   a radial wall extending from the sleeve to an outer rim which abuts the body of the conformal filter.

2. The filter assembly according to claim 1 and further comprising an interlock between the connector piece and the conformal filter to preclude the mounting of the connector piece on the conformal filter after removal.

3. The filter assembly according to claim 2 wherein the interlock includes resilient locking members.

4. The filter assembly according to claim 2, further comprising a locking piece mounted to the connector piece to form a portion of the interlock.

5. The filter assembly according to claim 2 wherein the connector piece and the conformal filter connector are configured so that the connector piece is removable from the conformal filter without the use of tools.

6. The filter assembly according to claim 1 and further comprising a seal between the connector of the conformal filter and the one end of the sleeve.

7. The filter assembly according to claim 6 wherein the seal further comprises an elastomeric material.

8. The filter assembly according to claim 7 wherein the conformal filter integral connector and connector piece are connected together with a predetermined torque.

9. The filter assembly according to claim 1 wherein the integral connector has external threads and the connector piece has internal threads that are threadable on the integral connector external threads.

10. The filter assembly according to claim 1 and further comprising a welded frangible tab between the connector piece and the conformal filter which prevents unintended loss of seal between the integral threaded connector and the conformal filter, and which facilitates removal of the threaded connector piece without the use of tools.

11. The filter assembly according to claim 1 further comprising:
    a seal that mounted between the integral threaded connector of the conformal filter and the one end of the sleeve of the threaded connector piece; and
    an installation tool configured to facilitate mounting of the threaded connector piece to the conformal filter.

12. The filter assembly according to claim 11, further comprising an interlock between the threaded connector piece and the conformal filter to preclude the mounting of the threaded connector piece on the conformal filter absent the use of the tool.

13. The filter assembly according to claim 12 wherein the tool has a part that is adapted to disengage the interlock for the mounting of the threaded connector piece to the conformal filter.

14. The filter assembly according to claim 11 and further comprising a welded frangible tab between the connector piece and the conformal filter which prevents unintended loss of seal between the integral threaded connector and the conformal filter, and which facilitates removal of the threaded connector piece without the use of tools.

15. The filter assembly according to claim 1 further comprising:
    a seal mounted between the integral threaded connector 40 of the conformal filter and the one end of the sleeve of the threaded connector piece; and
    a locking piece selectively mountable to the connector piece;
    wherein after the conformal filter, threaded connector piece, and the locking piece have been assembled, the locking piece forms a portion of an interlock between the threaded connector piece and the conformal filter to preclude remounting of the threaded connector piece on the conformal filter after the threaded connector piece has been removed from the conformal filter.

* * * * *